US009176609B2

(12) United States Patent
Wissgott et al.

(10) Patent No.: US 9,176,609 B2
(45) Date of Patent: Nov. 3, 2015

(54) APPARATUS AND METHOD FOR CONVEYING INFORMATION DISPLAYED ON A TOUCH SCREEN DEVICE

(75) Inventors: Paul Rudolf Wissgott, Hemel Hempstead (GB); Hitankumar Gulabhai Mistry, Harrow (GB)

(73) Assignee: Xerox Corporation, Norwalk, CT (US)

( * ) Notice: Subject to any disclaimer, the term of this patent is extended or adjusted under 35 U.S.C. 154(b) by 355 days.

(21) Appl. No.: 13/544,642

(22) Filed: Jul. 9, 2012

(65) Prior Publication Data
US 2014/0009405 A1    Jan. 9, 2014

(51) Int. Cl.
*G06F 3/041* (2006.01)
(52) U.S. Cl.
CPC ...................... *G06F 3/041* (2013.01)
(58) Field of Classification Search
CPC ..... G06F 3/041; G06F 3/0412; G06F 3/0416; G06F 3/04883; G06F 3/0488; G06F 3/044; G06F 3/0418
USPC ................... 345/173; 434/112, 113, 115, 117
See application file for complete search history.

(56) References Cited

U.S. PATENT DOCUMENTS 5,685,721 A  * 11/1997 Decker .......................... 434/114
6,354,839 B1 * 3/2002 Schmidt et al. ............... 434/113
6,743,021 B2 * 6/2004 Prince et al. .................. 434/113
2009/0174673 A1* 7/2009 Ciesla ........................... 345/173
2009/0220923 A1* 9/2009 Smith et al. ................... 434/113
2010/0097323 A1* 4/2010 Edwards et al. .............. 345/173
2010/0162109 A1* 6/2010 Chatterjee et al. ............ 715/702
2010/0182245 A1* 7/2010 Edwards et al. .............. 345/173
2011/0055698 A1* 3/2011 Ryu et al. ...................... 715/702

FOREIGN PATENT DOCUMENTS

JP          06-259006 A    * 9/1994   ............. G09B 21/00

OTHER PUBLICATIONS http://scitedaily.wordpress.com/2009/11/24/unflattening-the-touch-screen/ downloaded Apr. 18, 2012, 9 pages.

* cited by examiner

*Primary Examiner* — Olga Merkoulova

(57) ABSTRACT

An apparatus and method for conveying information displayed on a touch screen are disclosed. For example, the apparatus includes an overlay having an array of pockets, a plurality of valves, wherein each pocket of the array of pockets is coupled to at least one of the plurality of valves via a respective channel, a pump coupled to the plurality of valves for providing a fluid to one or more pockets of the array of pockets and a controller in communication with the pump and each one of the plurality of valves to control an operation of the pump and each one of the plurality of valves for activating the one or more pockets of the array of pockets to correspond to information on a touch screen of the touch screen device.

18 Claims, 6 Drawing Sheets

APPARATUS AND METHOD FOR CONVEYING INFORMATION DISPLAYED ON A TOUCH SCREEN DEVICE

The present disclosure relates generally to peripherals for touch screen devices that enable sight impaired persons (e.g., partial sighted or blind) to use a touch screen device and, more particularly, to an apparatus and method for conveying information displayed on a touch screen device.

BACKGROUND

The use of touch screen devices has grown in popularity via devices such as smart phones and tablet computers. However, a partially sighted or blind person may not be able to use a touch screen device.

One major drawback of the touch screen devices is that they cannot be adapted to the Braille system or even use tactile keys. Where some basic learning could master a hard key photocopier user interface, it is now impossible due to all of the possible options presented by soft keys on a user interface of the touch screen device. For example, a software upgrade could completely reconfigure the keys and render the touch screen device unusable without further re-training.

SUMMARY

According to aspects illustrated herein, there are provided an apparatus, a method and a non-transitory computer readable medium for conveying information displayed on a touch screen device. One disclosed feature of the embodiments is an apparatus that includes an overlay having an array of pockets, a plurality of valves, wherein each pocket of the array of pockets is coupled to at least one of the plurality of valves via a respective channel, a pump coupled to the plurality of valves for providing a fluid to one or more pockets of the array of pockets and a controller in communication with the pump and each one of the plurality of valves to control an operation of the pump and each one of the plurality of valves for activating the one or more pockets of the array of pockets to correspond to information on a touch screen of the touch screen device.

Another disclosed feature of the embodiments is a method that receives information that is displayed on a touch screen of the touch screen device, processes the information to determine a number of valves that need to be activated for activating one or more pockets of an array of pockets of an overlay to convey the information displayed on the touch screen, activates the number of valves and activates a pump to provide a fluid through the number of valves that need to be activated for activating the one or more pockets in accordance with the information displayed on the touch screen.

Another disclosed feature of the embodiments is a non-transitory computer-readable medium having stored thereon a plurality of instructions, the plurality of instructions including instructions which, when executed by a processor, cause the processor to perform a method that receives information that is displayed on the touch screen device, processes the information to determine a number of valves that need to be activated for activating one or more pockets of an array of pockets of an overlay to convey the information displayed on the touch screen device, activates the number of valves and activates the pump to provide a fluid through the number of valves that need to be activated for activating the one or more pockets in accordance with the information on the touch screen device.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus, a method and a non-transitory computer readable medium conveying information displayed on a touch screen device. As discussed above, partially sighted or blind people cannot use touch screen devices. One embodiment of the present disclosure provides a reprogrammable overlay that may be laid on top of a touch screen device. In one embodiment, the reprogrammable overlay may convey information and how the information is displayed on the touch screen device in a Braille form that may change as the information displayed on the touch screen device changes.

Figure 1:
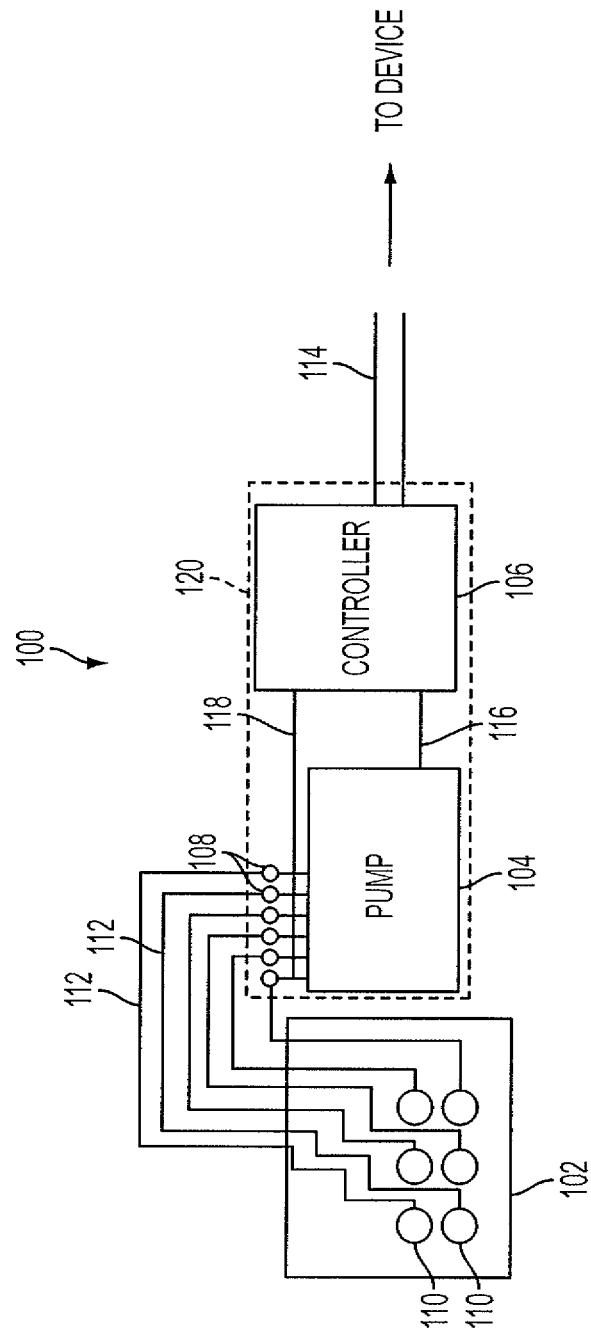
FIG. 1 illustrates one example of an apparatus for conveying information displayed on a touch screen device.

To better understand the present disclosure, FIG. 1 illustrates an example of an apparatus 100 for conveying information displayed on a touch screen device. In one embodiment, the apparatus 100 includes a clear overlay 102, a pump 104 and a controller 106. In one embodiment, the pump 104 and the controller 106 may be co-located in a single housing 120. The pump 104 may be controlled by the controller 106 via an electrical connection 116.

In one embodiment, the clear overlay 102 may include an array of pockets 110. The array of pockets 110 may be arranged in a grid or array form. Each one of the array of pockets 110 may be the same shape, for example a circle, a square, a polygon, and the like, or may be different shapes. The size of each one of the array of pockets 110 may be a function of a screen size of the touch screen device. However, the size of each one of the array of pockets 110 may be large enough for a person to feel the Braille letters as they are formed, yet small enough to convey the information displayed on the touch screen device. Although only six pockets 110 are illustrated in FIG. 1, it should be noted that the clear overlay 102 may include any number of pockets 110.

In one embodiment, the clear overlay 102 may comprise any type of plastic material allowing a touch screen device to detect activation of any soft keys or links by a person through the clear overlay 102. In one embodiment, the clear overlay 102 may be opaque or not completely clear. The clear overlay 102 may have a minimal thickness to maintain inflation of the one or more of the plurality of pockets 110 and allow the touch screen device to receive a selection of a soft key or link.

In one embodiment, each pocket of the array of pockets 110 may be coupled to a respective valve 108 via a respective channel 112. The valves 108 may be coupled to the pump 104.

The valves 108 may be controlled by the controller 106 by electrical connections 118. The valves 108 may be any type of electrically operated valves. For example, each of the valves 108 may be a micro solenoid valve.

In one embodiment, the pump 104 may be any type of pump capable of pumping fluid through the valves 108 to one or more of the array of pockets 110. The fluid may include, for example, air, water, oil and the like. In one embodiment, the pump 104 may be a simple plunger type pump.

Figure 5:
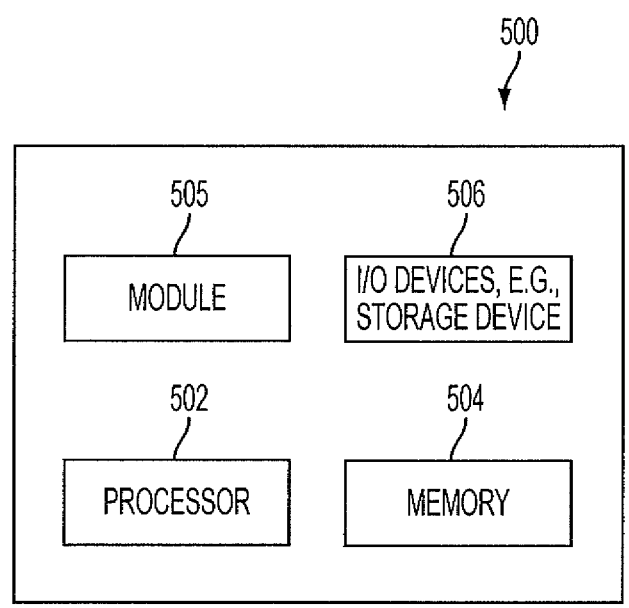
FIG. 5 illustrates a high-level block diagram of a general-purpose computer suitable for use in performing the functions described herein.

In one embodiment, the controller 106 may include a processor and a memory, for example, as illustrated in FIG. 5, and discussed below. The controller 106 may control operation of the valves 108 and the pump 104 to control which one of the array of pockets 110 should be inflated.

For example, the controller 106 may be in communication with the touch screen device via a connection 114. Although the connection 114 is illustrated as a physical connection, it should be noted that the connection may also be a wireless connection, for example, via Bluetooth, Zigbee, WiFi, radio frequency, and the like.

In one embodiment, the controller 106 may receive information that is displayed on the touch screen device. The information may be processed by the controller 106 to determine which valves 108 need to be opened to convey the information that is displayed on the touch screen device, e.g., a Braille translation. Once this information is processed, the appropriate valves 108 may be activated or opened and the pump 104 may be activated such that the appropriate pockets 110 are activated (e.g., inflated or deflated depending on the implementation).

Figure 2:
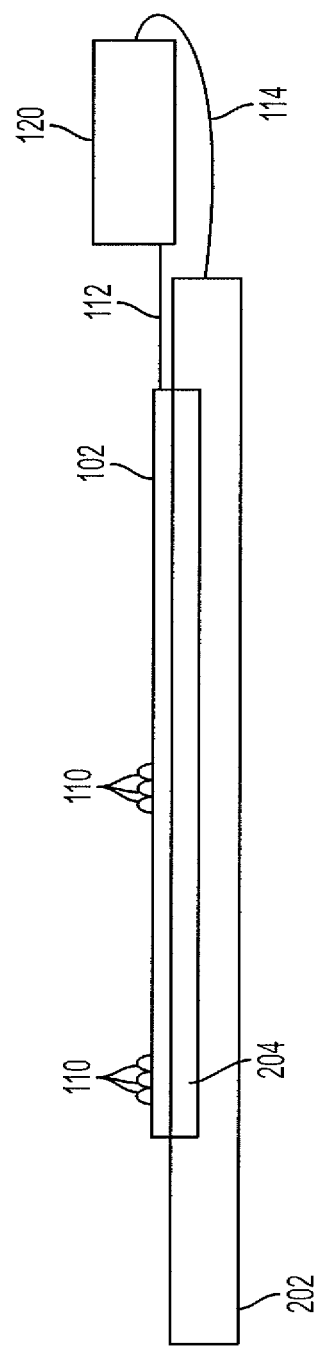
FIG. 2 illustrates a side view of one embodiment of the apparatus laid on top of a touch screen device.

One example of the pockets 110 being inflated is illustrated in FIG. 2. FIG. 2 illustrates a side view of one embodiment of the apparatus 100 laid on top of a touch screen device 202. In one embodiment, the touch screen device 202 may include a touch screen 204. For example, the touch screen 204 may display information such as text, graphics, video that a user may interact with by simply touching various portions of the touch screen 204.

FIG. 2 illustrates the clear overlay 102 laid on top of the touch screen 204 of the touch screen device 202. The one or more channels 112 connect the array of pockets 110 in the clear overlay 102 to one or more valves 108 in the housing 120 containing the pump 104 and the controller 106 as discussed above in FIG. 1. The controller 106 is in communication with the touch screen device 202 via an electrical connection 114.

When one or more of the array of pockets 110 are inflated, they may raise up to form a textured surface on various portions of the clear overlay 102. FIG. 2 illustrates a side view to illustrate how the inflated pockets 110 are raised such that a partially sighted person or a blind person could touch the clear overlay 102 to feel the pockets 110 that may form Braille words.

Figure 3:
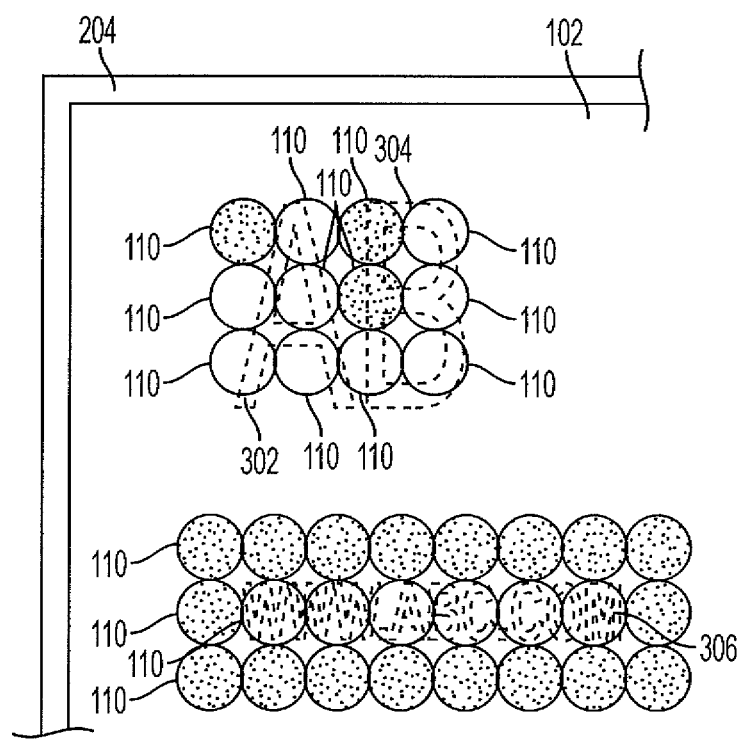
FIG. 3 illustrates a more detailed view of one embodiment of an array of pockets laid over a touch screen of a touch screen device.

FIG. 3 illustrates a more detailed view of one embodiment of the array of pockets 110 laid over the touch screen 204 of the touch screen device 202. As noted above, in one embodiment, the clear overlay 102 may convey information and how the information is displayed on the touch screen 204. For example, the pockets 110 may be inflated directly over each letter as they are located on the touch screen 204.

FIG. 3 illustrates the letters "A" 302 and "B" 304 on the touch screen 204. Accordingly, the pockets 110 over the letters "A" and "B" are inflated such that "A" and "B" are represented in Braille form. The shaded pockets 110 illustrate those pockets that are inflated.

In addition, soft keys or links, such as hyperlinks that may be activated, may be outlined such that a partially sighted or blind person may know that such areas are for confirmation or can activate other screens. For example, a hyperlink 306 on the touch screen 204 may be outlined by inflated pockets 110 as shown by the shaded pockets 110. As a result, the partially sighted or blind user may simply press the soft key "through" the clear overlay 102 to activate the hyperlink 306.

In one embodiment, hyperlinks may be distinguished from a yes button based upon how they are outlined. For example, a hyperlink may have all the pockets 110 inflated around it and a "yes" or a "continue" button may have every other pocket 110 inflated around it. A "no" or a "back" button may have a deflated pocket 110 between every two inflated pockets 110, and so forth. These are only several illustrative examples.

As noted above, the clear overlay 102 may be reprogrammable. As a result, if the information displayed on the touch screen 204 changes, the array of pockets 110 may be deflated and the controller 106 may then activate different valves 108 to inflate different pockets of the array of pockets 110 to convey the updated information on the touch screen 204.

In one embodiment, the touch screen device 202 may be modified to display in a lower resolution to operate with the apparatus 100. For example, the size of each pocket of the array of pockets 110 may limit how small the fonts may be on the touch screen device 202. Thus, to ensure that the clear overlay 102 may convey all the information displayed on the touch screen 204, the touch screen device 202 may be configured to display in a lower resolution, thereby, making the fonts larger than are displayed on the touch screen 204.

In another embodiment, a portion of the clear overlay 102 may include scrolling buttons. As a result, if the clear overlay 102 cannot convey all of the information displayed on the touch screen 204, the user may simply touch the "scroll down" portion of the clear overlay 102 to convey the next portion of information.

In another embodiment, the clear overlay 102 may be split into a text area and an action area. As a result, the clear overlay 102 need not convey information displayed on the touch screen 204 exactly as they appear on the touch screen 204. Rather, the clear overlay 102 may convey alphanumeric text information displayed on the touch screen 204 in the text area and soft keys or links in the action area. Thus, if a user is required to press a soft key, the user may simply feel in the action area for the appropriate soft key as required. The controller 106 may detect that a certain portion of the clear overlay 102 was pressed and pass the appropriate instructions to the touch screen device 202 as if the user had directly pressed the soft key on the touch screen 204.

Figure 4A:
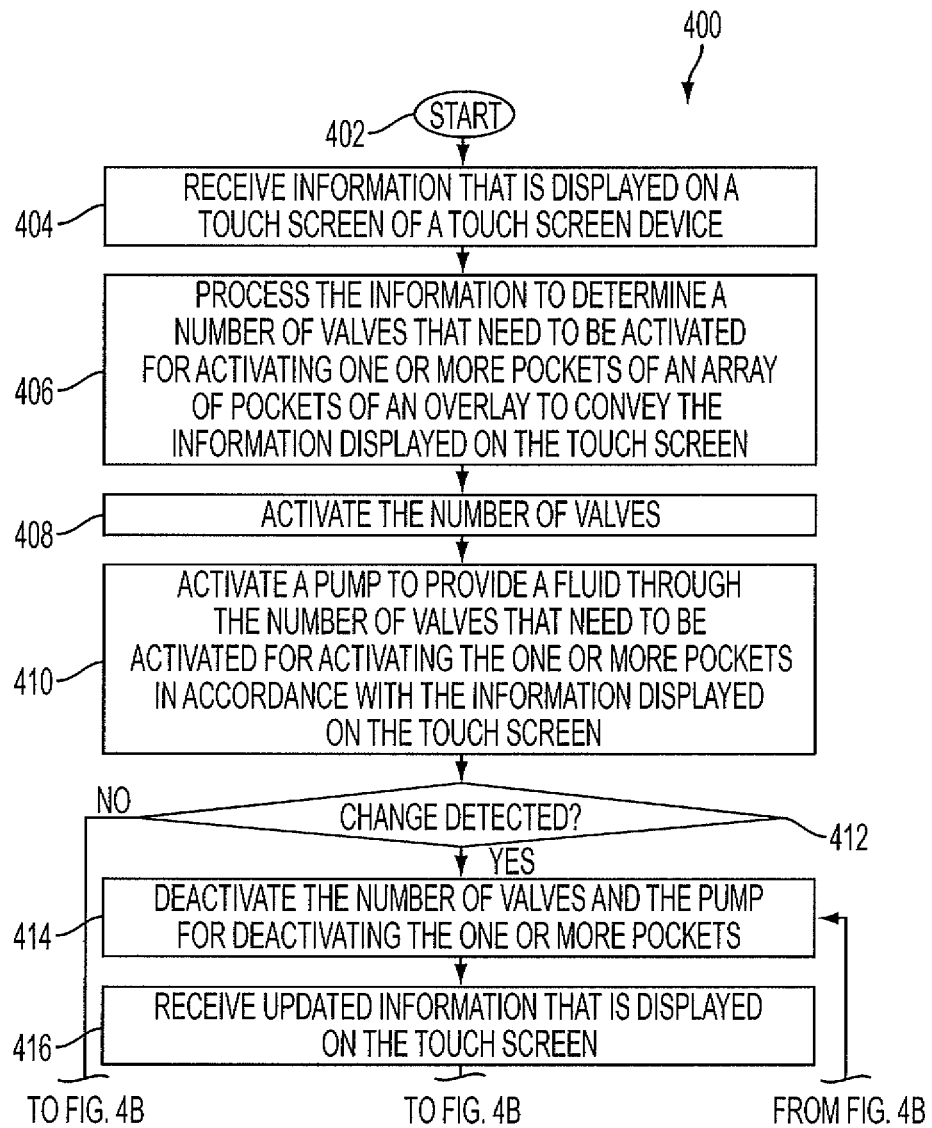
FIGS. 4A and 4B illustrate an example flowchart of one embodiment of a method for conveying information displayed on a touch screen device.
Figure 4B:
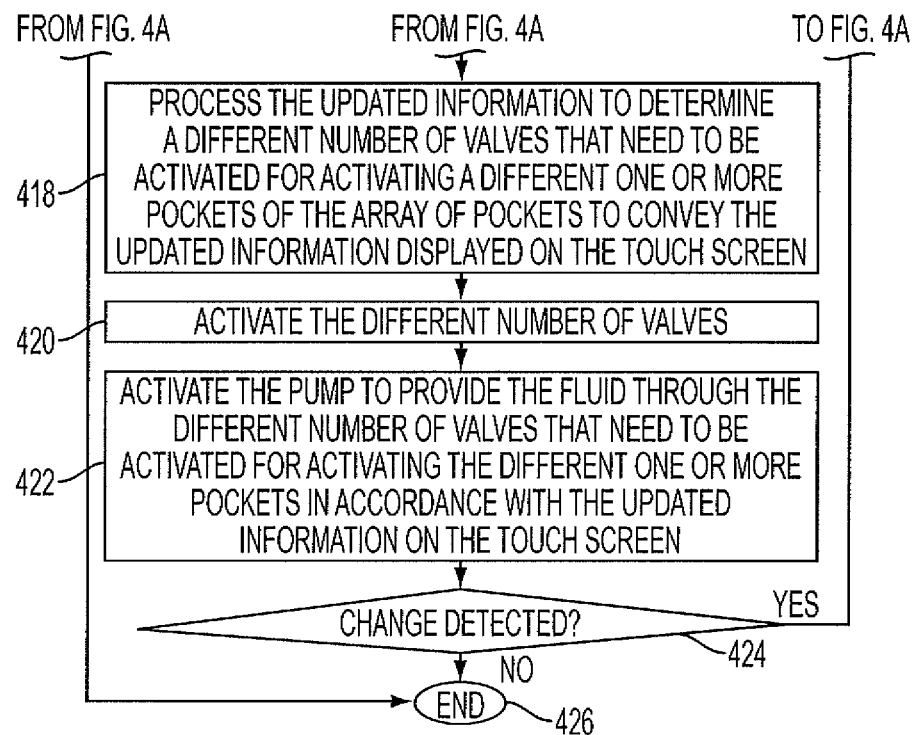

FIGS. 4A and 4B illustrate a flowchart of a method 400 for conveying information displayed on a touch screen device. In one embodiment, the method 400 may be performed by the controller 106 or a general purpose computer as illustrated in FIG. 5 and discussed below.

The method 400 begins at step 402. At step 404, the method receives information that is displayed on a touch screen of a touch screen device. For example, the controller 106 illustrated in FIG. 1 may be in communication with the touch screen device. In one embodiment, the touch screen device may be configured with software or programming instructions that instruct the touch screen device to send information that is displayed on the touch screen device to the controller 106. In one embodiment, the information may include a layout of text, graphics, soft keys and/or hyper links on the display of the touch screen device, what alphanumeric text is displayed, a size of the screen, a resolution of the screen, a font size of the alphanumeric text, and the like.

At step 406, the method 400 processes the information to determine a number of valves that need to be activated to inflate one or more pockets of an array of pockets of a clear overlay to convey the information displayed on the touch screen. In one embodiment, processing may include processing what words are displayed, what numbers are displayed, what soft keys are displayed, a location that each information is displayed (e.g., screen or array coordinates), a size of the information, whether the clear overlay can display all the information or whether the clear overlay needs to perform multiple inflation steps, and the like.

For example, if the touch screen device display the word "the" in the upper left hand corner, the controller 106 would determine which valves need to be activated to inflate the appropriate pockets in approximately the same location to represent in Braille the word "the". In another example, if the touch screen device displays a "yes" confirmation soft key button on the bottom right hand corner of the screen, the controller 106 would determine which valves need to be activated to inflate the appropriate pockets to outline the "yes" confirmation soft key button.

In another embodiment, as noted above, the clear overlay may be simplified to have a text area and an action area. As a result, the clear overlay may simply convey all the text information displayed by the touch screen device in the text area irrespective of location and then convey all of the action soft key buttons or active links in the action area. In one embodiment, if the user selects a button or link in the action area, the controller 106 may receive feedback (e.g., a pressure sensor on the respective inflated pockets indicating the button was pressed) and the controller 106 may send an instruction back to the touch screen device and the touch screen device may proceed as if the user had activated the button or link directly on the touch screen device.

At step 408, the method 400 activates the number of valves. Thus, once all of the necessary valves that need to be activated are identified by the controller 106, the controller 106 may instruct the identified valves to activate to an open position in one embodiment (or a close position depending on the implementation).

At step 410, the method 400 activates a pump to provide a fluid through the number of valves that need to be activated to inflate the one or more pockets in accordance with the information displayed on the touch screen. The fluid may be any fluid that can inflate the pockets, such as for example, air, water, oil and the like. It should be noted that in an alternative embodiment, the valves can be operated in a manner to remove the fluid from various pockets. Namely, the present disclosure can be implemented where the array of pockets are initially deflated (i.e., requiring inflation to various pockets to form a word) or where the array of pockets are initially inflated (i.e., requiring deflation to various pockets to form a word).

In one embodiment, the appropriate pockets of the array of pockets of the clear overlay are now controlled (i.e., inflated or deflated) to convey the information displayed on the touch screen device. In one embodiment, the information may be text and numbers and the pockets may be inflated or deflated to form the corresponding text and numbers in Braille form.

In another embodiment, the pockets may be inflated or deflated to convey a graphic or image to the user. For example, if a star is displayed on the touch screen device, the pockets of the clear overlay may be inflated to form an outline of a star such that a partially sighted or blind person may feel the shape of a star. In one embodiment, multiple layers of the clear overlay each having an array of pockets may be used to convey the graphic or image to the user. For example, the multiple layers of the clear overlay may be used to convey a three dimensional image of conveying different heights. For example, a three dimensional map having different height buildings could be conveyed, a three dimensional image of a group of objects such as a group of different sized balloons, and the like.

At step 412, the method 400 determines if there is a change detected. In other words, the method 400 determines if new information is displayed on the touch screen device. For example, the user may hit a "next" soft key and the touch screen device may display new information, e.g., a new web page, on the touch screen device.

If no change is detected at step 412, the method 400 proceeds to step 426 and ends. If a change is detected at step 412, the method proceeds to step 414.

At step 414, the method 400 deactivates the number of valves and the pump to deflate the one or more pockets. As noted above, the clear overlay is reprogrammable. By deflating or inflating the one or more pockets, new information may be conveyed to a user.

At step 416, the method 400 receives updated information that is displayed on the touch screen. For example, if a new web page is displayed on the touch screen device, the controller 106 may receive information that is associated with the updated information similar to the types of information provided and discussed above at step 404.

At step 418, the method processes the updated information to determine a different number of valves that need to be activated to inflate a different one or more pockets of the array of pockets to convey the updated information displayed on the touch screen. The processing at step 418 may be similar to the processing at step 406.

At step 420, the method 400 activates (e.g., inflates or deflates) the different number of valves. At step 422, the method 400 activates the pump to provide the fluid through the different number of valves that need to be activated to inflate the different one or more pockets in accordance with the updated information on the touch screen. As a result, the appropriate pockets of the array of pockets of the clear overlay are now inflated to convey the updated information displayed on the touch screen.

At step 424, the method 400 determines if another change is detected. For example, the user may navigate to another new web page or open a document of another program, and the like. If another change is detected, the method 400 proceeds back to step 414 and steps 414-424 are repeated. If another change is not detected at step 424, then the method 400 proceeds to step 426. The method ends at step 426.

It should be noted that although not explicitly specified, one or more steps, blocks or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIGS. 4A and 4B that recite a determining operation, or involve a decision, do not necessarily require that both branches of the determining operation be practiced. In other words, one of the branches of the determining operation can be deemed as an optional step.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for conveying information displayed on a touch screen device, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 505 for conveying information displayed on a touch screen device can be loaded into memory 504 and executed by processor 502 to implement the functions as discussed above. As such, the present method 505 for conveying information displayed on a touch screen device (including associated data structures) of the present disclosure can be stored on a non-transitory (tangible and physical) computer readable storage medium, e.g., RAM memory, magnetic or optical drive or diskette and the like. For example, the hardware processor 502 can be programmed or configured with instructions (e.g., computer readable instructions) to perform the steps of method 400.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus for conveying information displayed on a touch screen device, comprising:
    an overlay having an array of pockets;
    a plurality of valves, wherein each pocket of the array of pockets is coupled to at least one of the plurality of valves via a respective channel;
    a pump coupled to the plurality of valves for providing a fluid to one or more pockets of the array of pockets; and
    a controller in communication with the touch screen device, the pump and each one of the plurality of valves to control an operation of the pump and each one of the plurality of valves for activating the one or more pockets of the array of pockets to correspond with information on a touch screen of the touch screen device, wherein the activating comprises inflating pockets around a hyperlink displayed on the touch screen device and to configure a resolution of the touch screen device to change the resolution to a lower resolution to increase a font size that is displayed on the touch screen device based upon a size of the each pocket of the array of pockets.

2. The apparatus of claim 1, wherein the one or more pockets of the array of pockets are activated to convey the information displayed on the touch screen in a Braille form.

3. The apparatus of claim 1, wherein the one or more pockets of the array of pockets are activated to convey a location of a soft key on the touch screen.

4. The apparatus of claim 3, wherein the overlay comprises a clear plastic material having a minimal thickness for maintaining inflation of the one or more pockets of the array of pockets and for allowing the touch screen device to receive a selection of a soft key.

5. The apparatus of claim 1, wherein the fluid comprises at least one of: air, water or an oil.

6. The apparatus of claim 1, wherein at least one of the plurality of valves comprises a micro-solenoid valve.

7. The apparatus of claim 1, wherein the overlay is for being laid on top of the touch screen.

8. A method for conveying information displayed on a touch screen device, comprising:
    configuring a resolution of the touch screen device to change the resolution to a lower resolution to increase a font size that is displayed on the touch screen device based upon a size of each pocket of an array of pockets of an overlay on the touch screen device;
    receiving information that is displayed on a touch screen of the touch screen device, wherein the information is received via an electrical connection to the touch screen device;
    processing the information to determine a number of valves that need to be activated for activating one or more pockets of the array of pockets of the overlay to convey the information displayed on the touch screen;
    activating the number of valves; and
    activating a pump to provide a fluid through the number of valves that need to be activated for activating the one or more pockets in accordance with the information displayed on the touch screen, wherein the activating comprises inflating pockets around a hyperlink displayed on the touch screen device.

9. The method of claim 8, wherein the one or more pockets of the array of pockets are activated to convey the information displayed on the touch screen in a Braille form.

10. The method of claim 8, wherein the one or more pockets of the array of pockets are activated to convey a location of a soft key on the touch screen.

11. The method of claim 8, further comprising:
    receiving an indication that the information displayed on the touch screen has changed;
    deactivating the number of valves and the pump for deactivating the one or more pockets;
    receiving updated information that is displayed on the touch screen;
    processing the updated information to determine a different number of valves that need to be activated for activating a different one or more pockets of the array of pockets to convey the updated information displayed on the touch screen;
    activating the different number of valves; and
    activating the pump to provide the fluid through the different number of valves that need to be activated for activating the different one or more pockets in accordance with the updated information on the touch screen.

12. The method of claim 8, wherein the fluid comprises at least one of: air, water or an oil.

13. The method of claim 8, wherein at least of the valves comprises a micro-solenoid valve.

14. The method of claim 8, comprising:
    deploying the array of pockets via the overlay that is for being laid on top of the touch screen.

15. The method of claim 14, wherein the overlay comprises a clear plastic material having a minimal thickness for maintaining inflation of the one or more pockets of the array of pockets and for allowing the touch screen device to receive a selection of a soft key.

16. An apparatus for conveying information displayed on a touch screen device, comprising:
    a clear overlay having an array of air pockets;
    a plurality of micro solenoid valves, wherein each air pocket of the array of air pockets is coupled to at least one of the plurality of micro solenoid valves via a respective air channel;

a pump coupled to the plurality of micro solenoid valves for providing air to one or more air pockets of the array of air pockets; and a processor in communication with the touch screen device, the pump and each one of the plurality of micro solenoid valves to control an operation of the pump and each one of the plurality of micro solenoid valves for activating the one or more pockets of the array of pockets to form words in Braille corresponding to each word and outline the words in Braille formed by the one or more pockets that correspond to a hyper-link displayed on a touch screen of the touch screen device by inflating pockets around the words in Braille and to configure a resolution of the touch screen device to change the resolution to a lower resolution to increase a font size that is displayed on the touch screen device based upon a size of the each pocket of the array of pockets.

17. The apparatus of claim 16, wherein the clear overlay comprises a plastic material having a minimal thickness for maintaining inflation of the one or more air pockets of the array of air pockets and for allowing the touch screen device to receive a selection of the soft key.

18. The apparatus of claim 16, wherein the clear overlay is for being laid on top of the touch screen.

\* \* \* \* \*